(12) United States Patent　　(10) Patent No.: US 8,770,245 B2
Misani et al.　　(45) Date of Patent: Jul. 8, 2014

(54) TYRE FOR TWO-WHEELED VEHICLE AND PROCESS FOR MANUFACTURING THE SAME

(75) Inventors: Pierangelo Misani, Milan (IT); Mariani Fiorenzo, Milan (IT); Marco Cantu', Milan (IT)

(73) Assignee: Pirelli Tyre S.p.A., Milan (IT)

(*) Notice: Subject to any disclaimer, the term of this patent is extended or adjusted under 35 U.S.C. 154(b) by 241 days.

(21) Appl. No.: 13/141,040

(22) PCT Filed: Dec. 22, 2008

(86) PCT No.: PCT/IB2008/003607
§ 371 (c)(1),
(2), (4) Date: Jun. 20, 2011

(87) PCT Pub. No.: WO2010/073056
PCT Pub. Date: Jul. 1, 2010

(65) Prior Publication Data
US 2011/0315294 A1　　Dec. 29, 2011

(51) Int. Cl.
*B60C 9/18*　　(2006.01)
*B60C 9/28*　　(2006.01)
*B29D 30/16*　　(2006.01)
*B29D 30/22*　　(2006.01)
*B29D 30/70*　　(2006.01)

(52) U.S. Cl.
USPC ............ 152/526; 152/538; 156/123; 156/124

(58) Field of Classification Search
USPC ................................... 152/538; 156/123, 124
See application file for complete search history.

(56) References Cited

U.S. PATENT DOCUMENTS

| | | | | |
|---|---|---|---|---|
| 4,732,199 | A * | 3/1988 | Kajiwara | 152/557 |
| 7,399,374 | B2 * | 7/2008 | Pialot | 156/117 |
| 2005/0217783 | A1 | 10/2005 | Valle et al. | |
| 2006/0090831 | A1 | 5/2006 | Yovichin et al. | |

FOREIGN PATENT DOCUMENTS

| | | |
|---|---|---|
| EP | 0 928 680 A1 | 7/1999 |
| EP | 0 943 421 A1 | 9/1999 |
| EP | 0 976 535 A2 | 2/2000 |
| EP | 1 302 381 A1 | 4/2003 |

(Continued)

OTHER PUBLICATIONS

International Search Report from the European Patent Office for International Application No. PCT/IB2008/003607 (Mail date May 25, 2009).

*Primary Examiner* — Justin Fischer
(74) *Attorney, Agent, or Firm* — Finnegan, Henderson, Farabow, Garrett & Dunner, L.L.P.

(57) ABSTRACT

In the manufacture of a tire, a belt structure is made by means of strip-like segments or elements, each comprising parallel cords embedded in an elastomeric layer, sequentially laid along the circumferential extension of a toroidal support, in such a manner that: each strip-like element is laid in a laying trajectory defining, at each point, a laying angle; at each point of the laying trajectory a laying gap is formed between adjacent strip-like elements, the laying trajectory being formed starting from preselected laying angles on the shoulder and on the crown of the tire, the laying gap between adjacent strip-like elements varying along at least one section of the laying trajectory between crown and shoulder so as to cause variation of the laying angle and to obtain the preselected angles on the shoulder and on the crown.

17 Claims, 5 Drawing Sheets

(56) References Cited

FOREIGN PATENT DOCUMENTS

| EP | 1 652 658 A1 | 5/2006 |
| JP | 61-37501 * | 2/1986 |
| WO | WO-01/38077 A1 | 5/2001 |
| WO | WO-2010/073055 A1 | 7/2010 |

* cited by examiner

TYRE FOR TWO-WHEELED VEHICLE AND PROCESS FOR MANUFACTURING THE SAME

CROSS REFERENCE TO RELATED APPLICATION

This application is a national phase application based on PCT/IB2008/003607, filed Dec. 22, 2008, the content of which is incorporated herein by reference.

BACKGROUND OF THE INVENTION

1. Field of the Invention

The present invention relates to a tyre for two-wheeled vehicles and to a process for manufacturing such a tyre.

In particular, the present invention pertains to a tyre for two-wheeled vehicles provided with a reinforcing structure obtained by applying strip-like elements along the circumferential extension of a toroidal support. Each of said strip-like elements comprising longitudinal reinforcing thread elements disposed parallel to each other and at least partly coated with at least one layer of elastomeric material.

2. Description of the Related Art

A tyre for vehicle wheels usually comprises a carcass structure essentially made up of one or more carcass plies shaped into a substantially toroidal configuration and having their axially opposite lateral edges in engagement with respective annular reinforcing structures incorporating circular metal inserts, usually referred to as "bead cores". Each annular reinforcing structure is embedded in a so-called "bead" for anchoring the latter to a corresponding mounting rim.

Applied to the carcass structure, at a radially external position, is a belt structure comprising one or more belt layers in the form of a closed ring, essentially made up of textile or metallic cords suitably oriented relative to each other and to the cords belonging to the adjacent carcass plies.

Further applied to the belt structure, at a radially external position, is a tread band usually consisting of a strip of elastomeric material of suitable thickness. It is to be pointed out, to the aims of the present specification, that by the term "elastomeric material" it is intended a compound comprising at least one elastomeric polymer and at least one reinforcing filler. Preferably, this compound further comprises additives such as cross-linking agents and/or plasticizers, for example. Due to the presence of the cross-linking agents, this material can be cross-linked through heating, so as to form the final article of manufacture.

A pair of sidewalls is applied onto the opposite sides of the tyre, each of them coating a side portion of the tyre included between a so-called shoulder region, located close to the corresponding lateral edge of the tread band, and the corresponding bead.

Recently particular attention has been paid to the research of production methods enabling manufacture of intermediate semifinished products intended for tyre building to be eliminated or at least limited. For instance, in the European patent EP09288680 in the name of the same Applicant, it is disclosed a method of manufacturing tyres in which the carcass ply or plies, as well as each of the belt layers, is obtained by laying a plurality of strip-like elements one after the other in a circumferentially approached relationship, on a toroidal support such shaped as to match the inner conformation of the tyre to be obtained.

In document WO01/38077 in the name of the same Applicant it is disclosed another method and an apparatus for manufacturing a belt layer for vehicle tyres through laying of strip-like elements cut from a continuous strip-like element. In detail, the cut strip-like elements are applied in mutually approached relationship without leaving any space between one strip-like element and the one subsequently laid, along the circumferential extension of a toroidal support. The aforesaid application allows at least one reinforcing layer to be obtained which has a continuous circumferential extension around a geometric rotation axis of the toroidal support. During this application, between the strip-like element and the toroidal support a relative angular rotation is determined around a correction axis that is substantially radial to the geometric rotation axis of the toroidal support to avoid overlapping of the ends of the strip-like elements in the vicinity of the tyre shoulder. As compared with tyres for four-wheeled vehicles, tyres for two-wheeled vehicles are required to offer a quite peculiar performance involving many structural differences. One of the most important differences results from the fact that when a two-wheeled vehicle is running on a bend it must tilt laterally to a great extent as compared to its position when running on a straight stretch, thus forming with the perpendicular to the ground an angle (referred to as camber angle) that can reach 45°, or even 65° under hard handling conditions. Therefore, when the two-wheeled vehicle negotiates a bend, the contact area of the tyre progressively moves from the central region of the tread towards the axially outermost region in the direction of the curve centre. For this reason, tyres for two-wheeled vehicles are distinguishable by their marked transverse curvature. This transverse curvature is usually, defined by the particular value of the ratio of the distance between the radially external point of the tread and the line passing through the laterally opposite extremities of the tread itself measured on the equatorial plane of the tyre, to the distance measured along the tyre chord between said extremities. In tyres for two-wheeled vehicles, the value of the curvature ratio is generally at least as high as 0.15 and is usually in the order of about 0.3 in the case of rear tyres and even higher, until about 0.45, in the case of front tyres, against a value usually in the order of about 0.05 in tyres for four-wheeled vehicles.

In addition, in tyres for two-wheeled vehicles the belt structure can be made up of one or more continuous cords wound into axially approached coils substantially parallel to the circumferential extension direction of the tyre (the so-called "zero-degree belt"). Alternatively, the belt structure can consist of two radially superposed layers, each consisting of elastomeric material reinforced with cords disposed parallel to each other, said layers being such arranged that the cords of the first belt layer are oriented obliquely to the equatorial plane of the tyre, while the cords of the second layer have an oblique orientation as well, but symmetrically crossed relative to the cords of the first layer (the so-called "crossed belt").

The orientation angle of the cords of each layer is very important for obtaining some features in the tyre. For instance, to a low value of this angle (tending to 0°), both on the shoulder and on the crown, a high stability in the straight stretch corresponds, but a poor lateral thrust.

On the contrary, to high values of said angle, both on the shoulder and on the crown, a high ride comfort corresponds, but a more reduced stability in cornering.

SUMMARY OF THE INVENTION

The Applicant has perceived that laying of strip-like elements for manufacturing a so-called crossed belt according to the teachings of the known art can be carried out with difficulty in a tyre for two-wheeled vehicles; in fact for avoiding overlapping of the ends of the strip-like elements at the tyre shoulder, the high curvature of these tyres would involve an angular correction that can be hardly reached.

The Applicant has also noticed that, according to the teachings of application WO01/38077, the tyre manufacturer must choice between having cords disposed with a given angle on the crown and cords disposed with a given angle on the shoulder. In other words, the tyre manufacturer is not free to select the optimal angles of the cords on the shoulder and on the crown as a function of the features that he would like to obtain in the tyre.

In this case, in fact, the angle of the cords on the crown depends on the angle on the shoulder, on the curvature of the cross-section profile of the tyre and above all on the angular correction imposed in order to avoid overlapping of the ends of said strip-like elements at the tyre shoulder.

The Applicant has now found that by generating a space between two adjacent strip-like elements, which space varies in a preselected and controlled manner along the circumferential extension of the tyre cross-section, it is possible to obtain preselected angles of the cords both on the shoulder and on the crown. In this way, the cord angles both on the shoulder and on the crown will be no longer a function of the curvature of the tyre and of the imposed angular correction in order to avoid overlapping of the belt ends, but a function of the desired performance on the tyre.

The Applicant has also found that if the laying space between two adjacent strip-like elements is purposely controlled, it is also possible to obtain a belt layer devoid of overlaps at the ends of the strip-like element and consequently a belt having a high structural evenness.

In a first aspect, the invention relates to a tyre for two-wheeled vehicles comprising:
  a carcass structure of substantially toroidal shape including a central crown portion and two axially opposite side portions, each side portion being associated with a respective bead structure;
  a belt structure of substantially annular shape applied at a radially external position to the carcass structure at the central crown portion;
  a tread band applied at a radially external position relative to the belt structure;
  a pair of sidewalls, each of which covers a side portion of the tyre included between a lateral edge of the tread band and the respective bead structure;
  said tyre having a transverse-curvature ratio f/C≥0.2 and a height sidewall ratio (H−f)/H≤0.7;
  said belt structure comprising at least one belt layer formed with a plurality of strip-like elements, each comprising reinforcing thread elements disposed parallel to each other along a longitudinal direction of the strip-like element;
  each reinforcing element is disposed in a laying trajectory (T) defining, at each point, a laying angle ($\alpha$) relative to a meridian plane ($\lambda$) of the tyre passing through that point;
  wherein the strip-like elements of said plurality are laid in such a manner that the distance or gap ($\Delta g$) between the last reinforcing element of a strip-like element and the first reinforcing element of the subsequent strip-like element in the circumferential direction is variable over at least one section of the respective laying trajectories (T).

In the specification and in the appended claims, the cases are not taken into account, in which a distance ($\Delta g$) between the last reinforcing element of a strip-like element and the first reinforcing element of the subsequent strip-like element in the circumferential direction is only formed in one or some of the adjacent strip-like elements, due to an error in the laying process. In these cases, in fact, the deviation is generally of small amount, smaller or equal to 1 mm and is, at most, repeated for some strip-like elements forming the belt.

It is also provided that the laying angle at the shoulder ($\alpha_{sp}$) is greater than the laying angle ($\alpha_c$) at the equatorial plane of the tyre.

According to an embodiment, the variation in the distance ($\Delta g$) is in relationship with an angle difference on the shoulder and at the equatorial plane of the tyre, so that ($\alpha_{sp}$)−($\alpha_c$) ≥3°.

It is also provided that the laying gap between two subsequently laid strip-like elements is included in the range of 0.35 to 4 mm, extremes included.

According to an advantageous aspect of the present invention, the angle at the equatorial plane $\alpha_c \geq 14°$.

Advantageously, the angle at the equatorial plane $\alpha_c \leq 24°$.

According to another advantageous aspect, the angle at the tyre shoulder $\alpha_{sp} \geq 21°$.

Advantageously, the angle at the tyre shoulder $\alpha_{sp} \leq 30°$.

According to an embodiment, the strip-like elements forming said belt layers are present in an integer N smaller than an integer $N_0$, $N_0$ being defined as the whole part of:

$$\text{integer}|(S_c/L^* \sin \alpha_c)|$$

wherein:
$S_c$ is the circumferential extension of the belt layer at the equatorial plane of the tyre;
$\alpha_c$ is the laying angle at the equatorial plane of the tyre;
L is the transverse width of each strip-like element.

In another aspect, the present invention relates to a process for manufacturing a tyre for two-wheeled vehicles of the type provided with a transverse-curvature ratio f/C≥0.2 and a height sidewall ratio (H−f)/H≤0.7;
said process comprising the steps of:
  manufacturing a carcass structure of substantially toroidal shape, said carcass comprising a central crown portion and two axially opposite side portions;
  manufacturing a belt structure of substantially annular shape at a radially external position to the carcass structure, at the central crown portion; said step of manufacturing the belt structure comprises manufacturing of at least one belt layer through laying on said carcass structure, of a plurality of strip-like elements each including reinforcing thread elements disposed parallel to each other along a longitudinal direction of the strip-like element,
wherein the step of manufacturing said at least one belt layer comprises:
  determining the laying angles of the reinforcing elements at the shoulder $\alpha_{sp}$ and at the equatorial plane $\alpha_c$ that are wished to be obtained on the tyre;
  determining a laying trajectory of the strip-like elements (T) defining, at each point, a laying angle ($\alpha$) relative to a meridian plane of the carcass structure passing through that point so as to obtain said angles $\alpha_{sp}$, $\alpha_c$, said laying trajectory (T) being in relationship with a strip-like element laying distance or inter-gap ($\Delta g$), between the last reinforcing element of a strip-like element and the first reinforcing element of the strip-like element subsequently laid in the circumferential direction;
  said distance ($\Delta g$) varying in a controlled and predetermined manner over at least one section of the respective laying trajectories (T) of two strip-like elements subsequently laid in the circumferential direction;
  laying each strip-like element according to the aforesaid laying trajectory (T).

Advantageously, the laying step takes place in such a manner as to avoid overlapping of the ends of the strip-like elements at the tyre shoulders.

Preferably, the laying distance between adjacent strip-like elements ($\Delta g$) varies, over at least one section of the respective laying trajectories (T) of two strip-like elements subsequently laid in the circumferential direction, in such a manner as to obtain an angle on the shoulder ($\alpha_{sp}$) greater than the angle at the equatorial plane of the tyre ($\alpha_c$).

More preferably, the laying distance between adjacent strip-like elements ($\Delta g$) varies in such a manner as to obtain angles on the shoulder and at the equatorial plane of the tyre in which ($\alpha_{sp}$)−($\alpha_c$)≥3°.

According to an embodiment, the integer N of the laid strip-like elements designed to form the belt layer is smaller than an integer $N_0$, $N_0$ being defined as the whole part of:

integer|(Sc/L* sin $\alpha_c$)| wherein:
$S_c$ is the circumferential extension of the belt layer at the equatorial plane of the tyre;
$\alpha_c$ is the laying angle of each strip-like element relative to said equatorial plane;
$\alpha_c$ is the laying angle at the equatorial plane of the tyre;
L is the transverse width of each strip-like element.

According to an embodiment:
the laying trajectory (T) is formed starting from preselected laying angles on the shoulder $\alpha_{sp}$ and at the equatorial plane $\alpha_c$ of the tyre;
the strip-like element inter-gap ($\Delta g$) between one strip-like element and the subsequently laid strip-like element varies over at least one section of the respective laying trajectories (T) of two strip-like elements subsequently laid in the circumferential direction between equatorial plane and shoulder in order to cause variation of said laying angle ($\alpha$) and obtain said preselected angles on the shoulder, and at the equatorial plane.

According to an embodiment:
the laying trajectory (T) and the strip-like element inter-gap ($\Delta g$) at each laying point between one strip-like element and the subsequently laid one are a function of:
an imposed maximum gap ($\Delta g_{max}$);
a width of the strip-like element L;
said preselected angles on the shoulder $\alpha_{sp}$ and at the equatorial plane $\alpha_c$.

According to an embodiment, the process comprises the following steps:
calculating the minimum rounded off by defect between the number ($N_{sp}$) of strip-like elements corresponding to the angle on the shoulder and the number ($N_c$) of strip-like elements corresponding to the angle at the equatorial plane min ($_{integer}|N_{sp}; N_c|$).
calculating $N_1$=min ($_{integer}|N_{sp}; N_c|$)−1;
calculating the strip-like element inter-gap on the shoulder ($\Delta g_{sp}$) and at the equatorial plane ($\Delta g_c$) for $N_1$;
comparing ($\Delta g_{sp}$) and ($\Delta g_{cr}$) with the imposed $\Delta g_{max}$:
if $\Delta g_{sp} \leq \Delta g_{max}$ and $\Delta g_e \leq \Delta g_{max}$, setting $N_1=N$
on the contrary, if $\Delta g_{sp} \geq \Delta g_{max}$ or $\Delta g_c \geq \Delta g_{max}$, calculating $N_n$ as min ($_{integer}|N_{sp}; N_c|$)−n, on varying of n, and recalculating the corresponding strip-like element inter-gap on the shoulder $\Delta g_{sp}$ and on the crown $\Delta g_n$ for each $N_n$; setting N=$N_n$ wherein $N_n$ is the integer of strip-like elements satisfying the relation $\Delta g_{sp}$ ($N_n$)≤$\Delta g_{max}$ and $\Delta g_n$ ($N_n$)≤$\Delta g_{max}$ Advantageously, $N_c$=($S_c$/$L_c$)*sin ($\alpha_c$) and $N_{sp}$=($S_{sp}$/$L_{sp}$)*sin ($\alpha_{sp}$) wherein S is the circumferential extension of the belt layer at angle $\alpha$.

Advantageously, $\Delta g_{sp}$=$S_{sp}$/$N_n$−$L_{sp}$/sin ($\alpha_{sp}$) and $\Delta g_c$=$S_c$/$N_n$−$L_c$/sin ($\alpha_c$).

BRIEF DESCRIPTION OF THE DRAWINGS

Further features and advantages of the present invention will become more apparent from the detailed description of a preferred but not exclusive embodiment of a vehicle tyre and a process for manufacturing a tyre having a reinforcing structure according to the present invention. This description will be set out hereinafter with reference to the accompanying drawings, given by way of non-limiting example, in which.

DETAILED DESCRIPTION OF THE INVENTION

Figure 1:
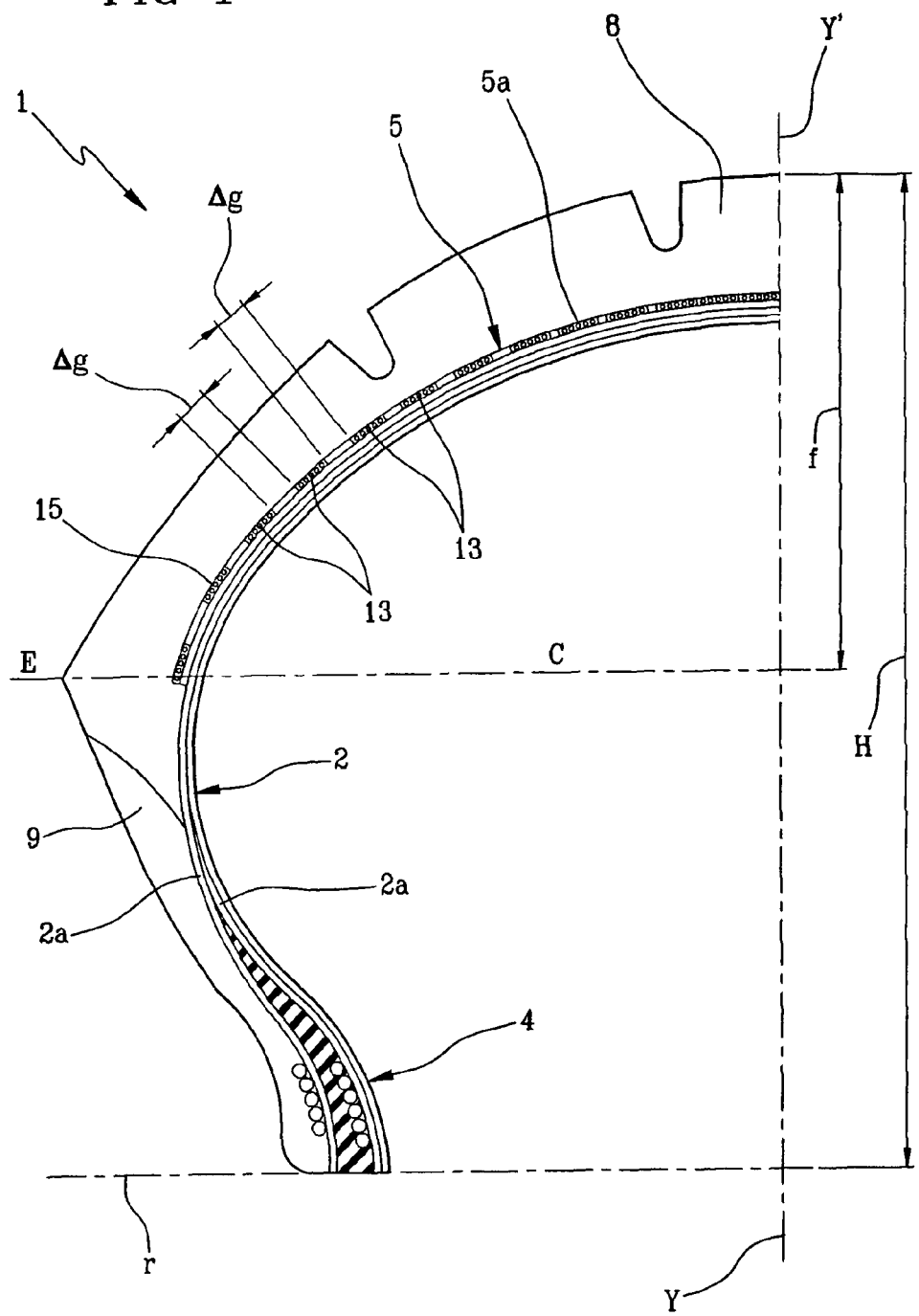
FIG. 1 is a partial radial section taken in a plane radial to the rotation axis of a tyre for two-wheeled vehicles according to the present invention.

With reference to the drawings, a tyre for two-wheeled vehicles in accordance with the present invention has been denoted at 1. In particular, said tyre 1 comprises a carcass structure 2 provided with at least one carcass ply 2a shaped into a substantially toroidal configuration and in engagement, through its opposite circumferential edges, with at least one annular reinforcing structure, so as to form a structure usually identified with the name of "bead" 4.

Circumferentially applied to the carcass structure 2, at a radially external position, is a belt structure 5 on which a tread band 8 is circumferentially superposed. Following a moulding operation carried out concurrently with vulcanisation of the tyre, longitudinal and transverse grooves are formed on said tread band 8, which are such disposed as to define a desired "thread pattern". The tyre in known manner also comprises a pair of sidewalls 9 laterally applied to the carcass structure 2, on opposite sides.

Said tyre 1 has a cross-section marked by a high transverse curvature and low-section sidewalls, as defined in the following.

In particular, tyre 1 has a section height H measured in the equatorial plane, between the centre of the tread band and the fitting diameter, identified by the reference line r passing through the tyre beads.

Tyre 1 further has a width C defined by the distance between the laterally opposite ends E of the tread, and a curvature defined by the particular value of the ratio between the distance f of the tread centre from the line passing through the extremities E of said tread, measured in the equatorial plane of the tyre, and said width C.

"High curvature-tyres" in the present specification and the following claims means tyres having a curvature ratio f/C≥0.2 and preferably f/C≥0.28. This curvature ratio f/C is in any case ≤0.8 and preferably f/C≤0.5.

Figure 3:
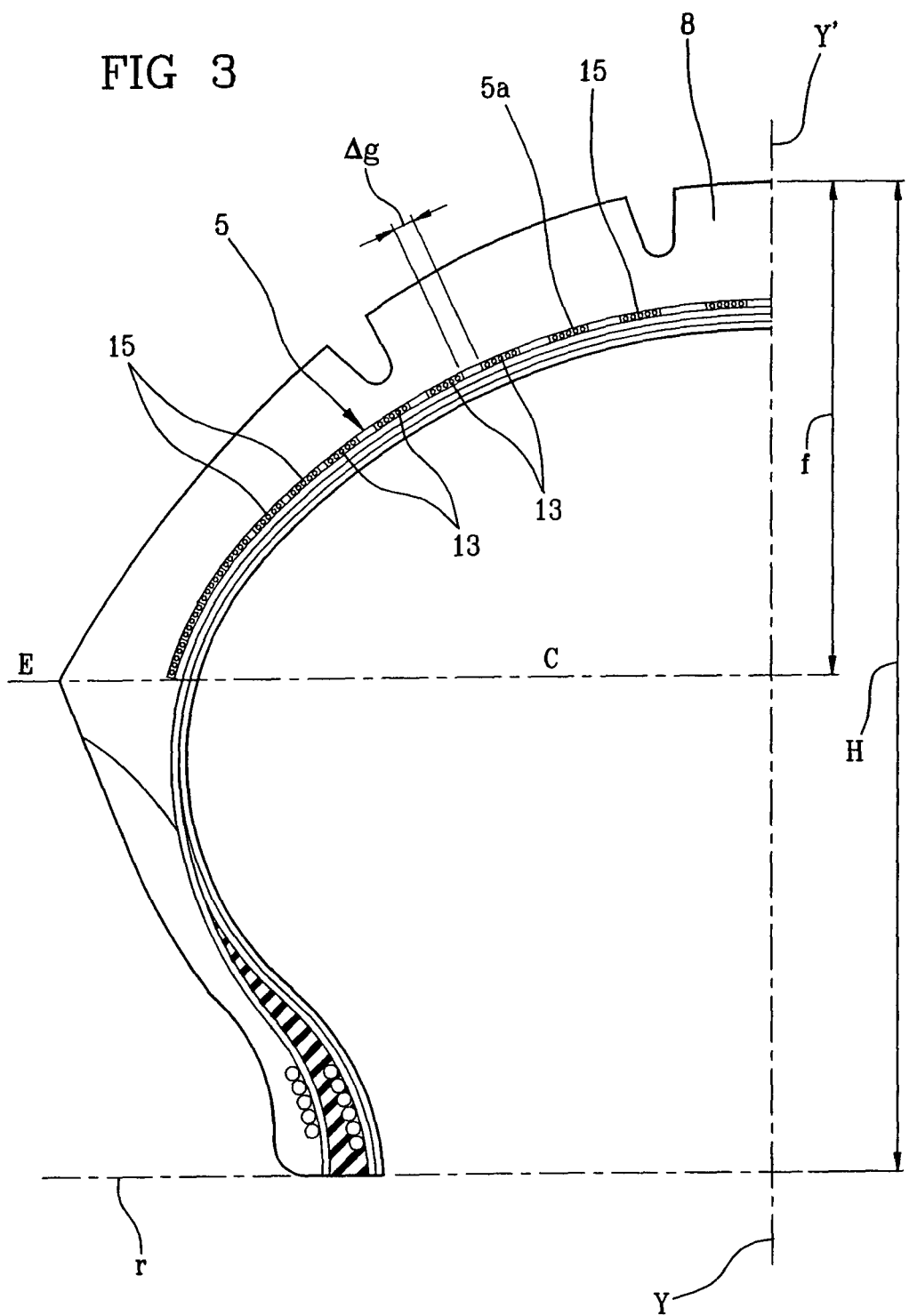
FIG. 3 is a partial radial section taken in a plane radial to the rotation axis of a second embodiment of a tyre for two-wheeled vehicles according to the present invention.

As to the sidewalls, the invention preferably applies to tyres with particularly low-section sidewalls (FIG. 1, FIG. 3). In other words, by low-section sidewalls in the present specification it is intended tyres in which the height sidewall ratio (H−f)/H is lower than 0.7, more preferably lower than 0.5 (see FIGS. 1, 3).

Turning back to the belt structure 5, it is pointed out that it comprises at least one belt layer 5a formed with a plurality of strip-like elements 15, each comprising reinforcing thread elements 13 disposed parallel to each other along a longitudinal direction of the strip-like element 15.

In the present specification by the term "strip-like element" it is intended a portion of a continuous strip-like element comprising longitudinal reinforcing cords 13 disposed parallel to each other and at least partly coated with at least one layer of elastomeric material, provided with one dimension (length) prevailing over the two other dimensions (width, thickness). In particular, preferably, the strip-like elements have a width included between 3 mm and 25 mm, a thickness included between 0.5 mm and 2 mm, contain a number of cords included between 2 and 40 and have a density preferably included between 60 and 130 cords by decimetre.

Figure 2:
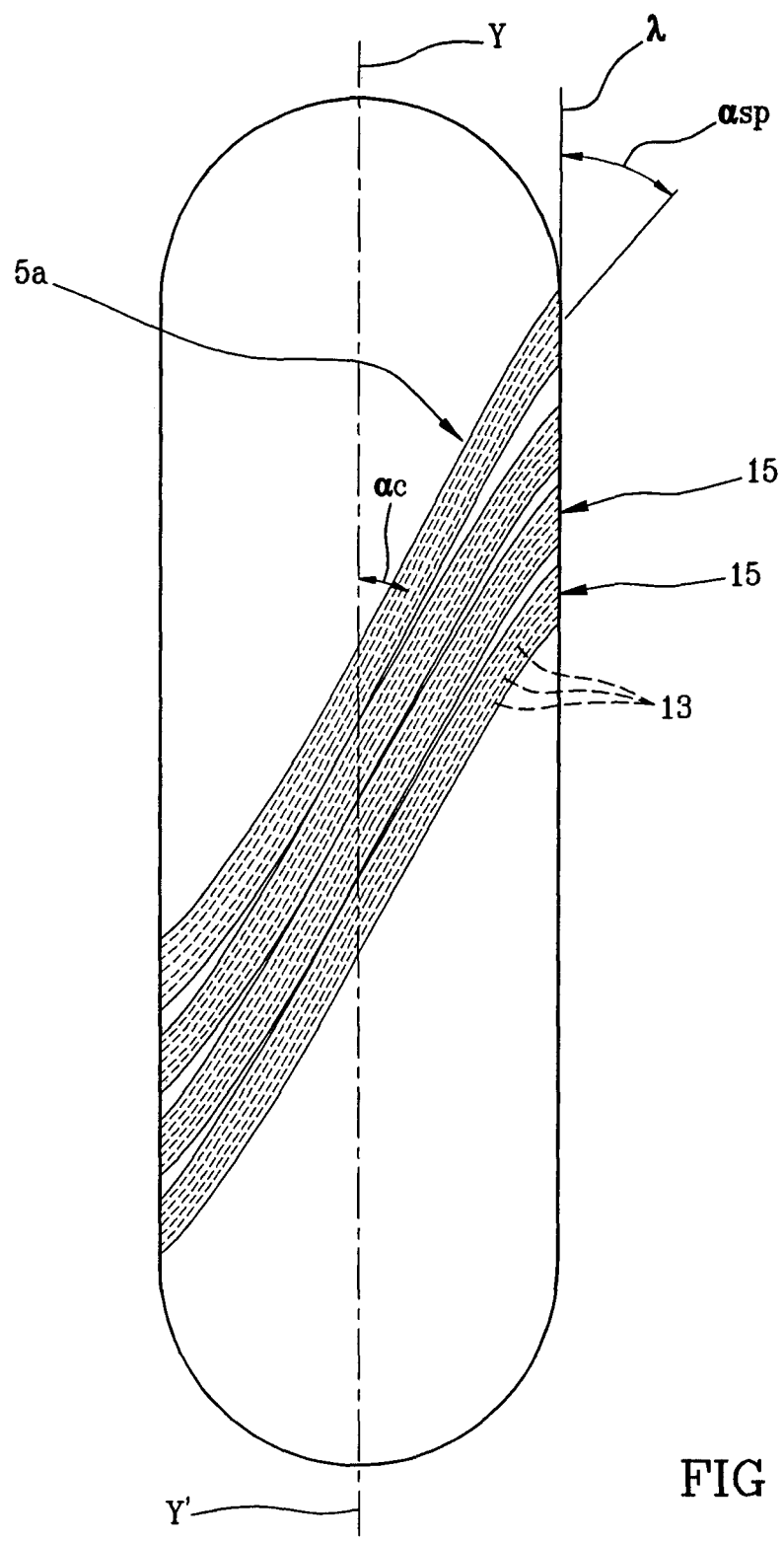
FIG. 2 is a diagrammatic top view of the tyre seen in FIG. 1 showing by way of example, four of the strip-like elements forming a belt layer, that are laid according to the present invention.

Each strip-like element 15, as better shown in FIG. 2, is disposed in a laying trajectory (T) that at each point defines a laying angle α relative to a meridian plane λ of the tyre passing through that point.

The laying angle (α) can also be seen as the angle enclosed between the main extension direction of each reinforcing thread element and the circumferential direction of the tyre.

It is also pointed out that each laying angle (α) is substantially different from zero and can vary on moving from the equatorial plane to the tyre shoulder.

In particular, the laying angle on the shoulder ($\alpha_{sp}$) is always greater than the laying angle at the equatorial plane ($\alpha_c$).

The strip-like elements 15 are disposed so as to form the belt layer 5a in such a manner that a strip-like element inter-gap (Δg) between one strip-like element and the strip-like element subsequently laid, is obtained.

The strip-like element inter-gap (Δg) in particular is defined as the distance between the last reinforcing element 13 of a strip-like element and the first reinforcing element 13 of the subsequent strip-like element 15 in the circumferential direction.

Figure 4:
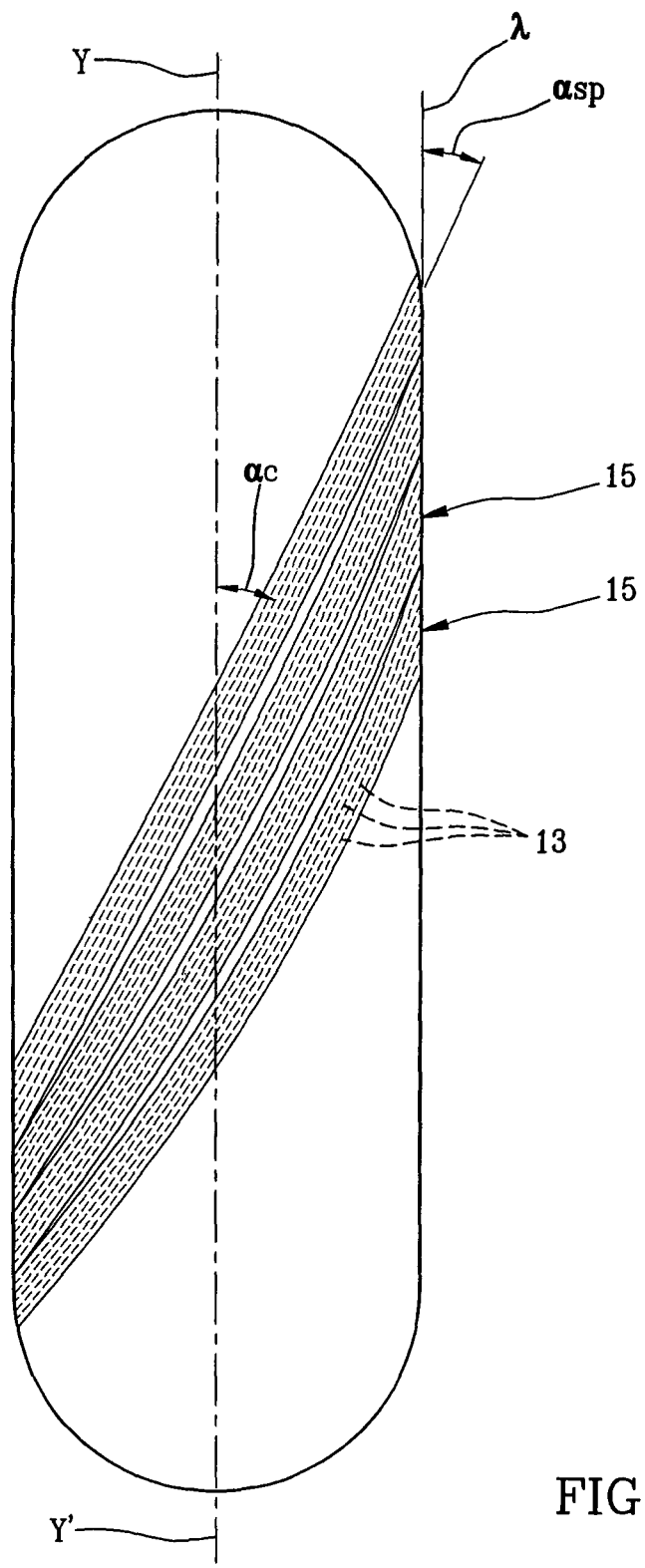
FIG. 4 is a diagrammatic top view of the embodiment of the tyre seen in FIG. 3 showing by way of example, four of the strip-like elements forming a belt layer, that are laid according to the present invention.
Figure 5:
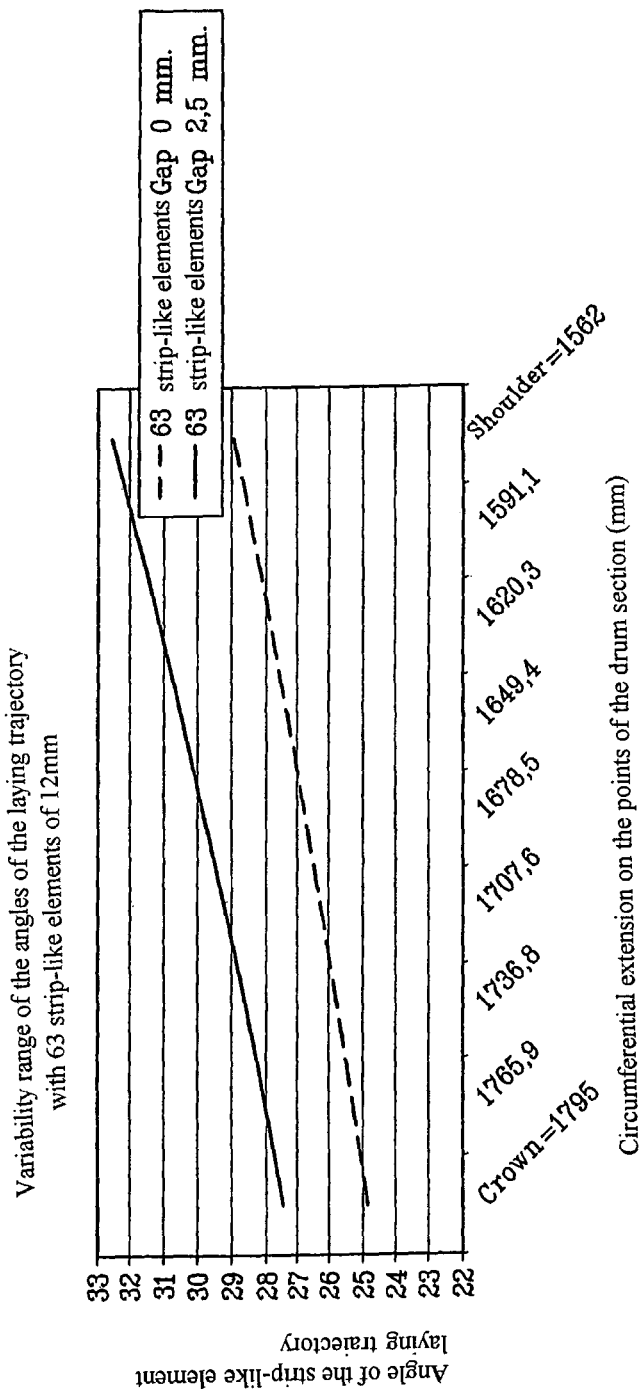
FIG. 5 shows in a graph (circumferential extension-angle of the strip-like element trajectory), the two curves of natural laying $T_o$ and $T_{max}$ and some laying trajectories that are possible with different preselected angles on the shoulder $\alpha_{sp}$ and on the crown $\alpha_{cr}$ according to the present invention.

The strip-like element inter-gap (Δg), as better shown in FIGS. 3 and 4, is varying for at least one portion of facing edges of adjacent strip-like elements, on moving from the shoulder to the equatorial plane of the tyre.

In particular, the strip-like element inter-gap (Δg) of the belt layer 5a shown in FIG. 2 increases on moving from the equatorial plane Y-Y', where it is substantially equal to zero, towards the tyre shoulder. Vice versa, the strip-like element inter-gap (Δg) of the belt layer 5a shown in FIG. 4 decreases on moving from the equatorial plane Y-Y' towards the tyre shoulder, wherein it is substantially equal to zero.

The strip-like element inter-gap (Δg) between one strip-like element 15 and the strip-like element subsequently laid varies along at least one section of the laying trajectory (T) between equatorial plane and tyre shoulder so as to cause variation of the laying angle (α) and obtain preselected laying angles on the shoulder and on the crown.

At all events, the variation in the strip-like element inter-gap (Δg) is in relation to a difference in the angles on the shoulder and at the equatorial plane of the tyre, so that ($\alpha_{sp}$)−($\alpha_c$)≥3°.

According to an advantageous aspect, the angle at the equatorial plane $\alpha_c$≥14°.

Advantageously the angle at the equatorial plane $\alpha_c$≤24°.

In another advantageous aspect the angle at the tyre shoulder $\alpha_{sp}$≥21°.

Advantageously, the angle at the tyre shoulder $\alpha_{sp}$≥30°

The strip-like element inter-gap (Δg) varies between 0.35 and 4 mm, the extremes being included.

Preferably, the strip-like element inter-gap (Δg) at each laying point between the edges of two strip-like elements 15 subsequently laid is preferably included between 0.5 and 2.5 mm, the extremes being included.

According to the present invention, the strip-like elements forming a belt layer 5a are present in an integer N smaller than an integer $N_0$, $N_0$ being defined as the whole part of:

$$\text{integer}|(S_c/L * \sin \alpha_c)|$$

wherein:
$S_c$ is the circumferential extension of the belt layer at the equatorial plane of the tyre;
L is the transverse width of each strip-like element 15.

In the present specification, with the notation "integer ||" it is identified the integer within the two vertical bars.

In a second aspect the invention relates to a process for manufacturing a tyre for two-wheeled vehicles of the type provided with a transverse-curvature ratio f/C≥0.2 and a height sidewall ratio (H−f)/H≤0.7.

The present invention can be advantageously put into practice within a manufacturing process according to which the belt structure lends itself to be made on a toroidal support having an outer surface the shape of which substantially matches the inner configuration of tyre 1 to be obtained.

Before carrying out manufacture of the belt structure 5, a carcass structure 2 is applied onto the toroidal support, which carcass structure can be conveniently formed on the same toroidal support, according to that which is described in anyone of patents EP0943421, EP0928680, EP0976535, EP01124699, all in the name of the same Applicant. The toroidal support, not described in detail as it can be made in any convenient manner by a person skilled in the art, can for example consist of a dismountable or collapsible metal drum to facilitate subsequent removal of said drum from the obtained tyre. However, the possibility is not excluded of making the belt structure directly on the carcass structure suitable stiffened, through inflation for example, so that in this case said carcass structure will also perform the function of, toroidal support.

Manufacture of the belt structure 5 for vehicle tyres according to the present invention involves application of a given number (N) of strip-like elements 15 of width (L) along the circumferential extension of the toroidal support so as to form at least one reinforcing layer 5a provided with a substantially continuous circumferential extension around a geometric rotation axis X-X' of the toroidal support itself.

Each strip-like element 15, as previously mentioned, comprises reinforcing longitudinal thread elements disposed parallel to each other and at least partly coated with at least one layer of elastomeric material.

In addition, it is pointed out that this plurality of strip-like elements 15 of predetermined length and width, is for instance obtained in known manner by cutting operations sequentially carried out on at least one continuous strip-like element coming either from an extruding and/or a calendering device, or from a feeding reel. The continuous strip-like element, and consequently the strip-like elements 15 obtained therefrom, as previously said, each have a plurality of thread elements and/or cords 13 of metal or textile material, extending parallel to each other along the longitudinal extension of the continuous strip-like element.

Each strip-like element 15 is laid on the outer surface of the toroidal support in a laying trajectory (T) defined at each point by a laying angle ($\alpha$) with the meridial reference plane of the toroidal support passing through that point.

Laying takes place in such a manner as to avoid an important overlapping of the ends of the strip-like elements 15 at the tyre shoulders.

The laying trajectory (T) is formed starting from preselected laying angles on the shoulder $\alpha_{sp}$ and at equatorial plane $\alpha_c$ of the tyre.

The laying trajectory (T) is obtained in such a manner that at each point of the laying trajectory (T) there is a strip-like element inter-gap ($\Delta g$) between one strip-like element 15 and the strip-like element subsequently laid, in particular between the last reinforcing element 13 of a strip-like element 15 and the first reinforcing element 13 of the subsequent strip-like element 15 in the circumferential direction.

The strip-like element inter-gap ($\Delta g$) between the last reinforcing element 13 of a strip-like element 15 and the first reinforcing element 13 of the subsequent strip-like element 15 in the circumferential direction varies along at least one section of the laying trajectory (T) between shoulder and equatorial plane in a predetermined and controlled manner.

In particular, the strip-like element inter-gap ($\Delta g$) varies in a controlled and predetermined manner between at least one portion of facing edges of the adjacent strip-like elements 15.

In other words, by way of example, the strip-like element inter-gap ($\Delta g$) could either vary over a starting section away from the equatorial plane and then keep constant or, as in the examples in FIGS. 2, 4, could vary along the whole laying trajectory (T).

The strip-like element inter-gap ($\Delta g$) varies in a controlled and predetermined manner for succeeding in obtaining the preselected angles on the shoulder $\alpha_{sp}$ and at the equatorial plane ($\alpha_c$).

In particular, the strip-like element inter-gap ($\Delta g$) varies in such a manner as to obtain an angle $\alpha_{sp}$ always greater than the angle at the equatorial plane of the tyre $\alpha_c$.

The strip-like element inter-gap is in relationship with an angle difference on the shoulder and on the crown of such a nature that $(\alpha_{sp})-(\alpha_c) \geq 3°$.

In addition, it is pointed out that the laying trajectory T and the strip-like element inter-gap ($\Delta g$) at each laying point between one strip-like element 15 and the strip-like element subsequently laid is a function of:
- an imposed maximum gap ($\Delta g_{max}$);
- a width of the strip-like element L;
- said preselected angles on the shoulder $\alpha_{sp}$ and at the equatorial plane $\alpha_c$.

For obtaining the laying trajectory T, initially the minimum integer rounded off by defect is calculated between the number ($N_{sp}$) of strip-like elements 15 corresponding to the angle on the shoulder and the number ($N_c$) of strip-like elements corresponding to the angle at the equatorial plane min ($_{integer}|N_{sp}; N_c|$)

Where $N_c=(S_g/L_c)*\sin(\alpha_c)$ wherein $S_c$ is the circumferential extension of the belt layer at the equatorial plane of the tyre and $\alpha_c$ is the angle at this plane, and $N_{sp}=(S_{sp}/L_{sp})*\sin(\alpha_{sp})$ wherein $S_{sp}$ is the circumferential extension of the belt layer 5a at the tyre shoulder.

At this point it is set $N_1=\min(_{integer}|N_{sp};N_c|)-1$ and calculated the strip-like element inter-gap on the shoulder ($\Delta g_{sp}$) and at the equatorial plane ($\Delta g_c$) corresponding to $N_1$; in particular $\Delta g_{sp}=S_{sp}/N_1-L_{sp}/\sin(\alpha_{sp})$ and $\Delta g_c=S_c/N_1-L_c/\sin(\alpha_c)$.

Now $\Delta g_{sp}$ and $\Delta g_c$ are compared with the imposed $\Delta g_{max}$; if $\Delta g_{sp} \leq \Delta g_{max}$ and $\Delta g_c \leq \Delta g_{max}$, $N_1=N$ is to be set; N will therefore be the real number of strip-like elements 15 that are laid in order to form the belt layer according to the present invention that has, as the angles at the equatorial plane Y-Y' and at the shoulder, the angles $\alpha_c$ and $\alpha_{sp}$ that are selected as a function of the behaviour features that are wished to be obtained on the tyre.

Alternatively, if $\Delta g_{sp} \geq \Delta g_{max}$ and/or $\Delta g_{cr} \geq \Delta g_{max}$, $N_n$ is calculated as min $(_{integer}|N_{sp}; N_c|)-n$, on varying of n, and the operations set out above are repeated. In other words, the strip-like element inter-gap on the shoulder ($\Delta g_{sp}$) and on the crown ($\Delta g_c$) corresponding to the new number $N_n$ is recalculated as far as the number of strip-like elements satisfying the relation $\Delta g_{sp}(N_n) \leq \Delta g_{max}$ and $\Delta g_c(N_n) \leq \Delta g_{max}$ is found.

The number of strip-like elements $N_n$ according to which said relation is satisfied, i.e. $\Delta_{sp}(N_n) \leq \Delta g_{max}$ and $\Delta g_c(N_n) \leq \Delta g_{max}$, will be set equal to N and represents the real number of strip-like elements that are laid in order to form the belt layer according to the present invention which has, as the angles on the crown and on the shoulder, the angles $\alpha_c$ and $\alpha_{sp}$ that are selected as a function of the behaviour features that are wished to be obtained on the tyre.

It is pointed out that the strip-like element inter-gap on the shoulder on varying of $N_n$ is calculated as $\Delta_{sp}=S_{sp}/N_r-L_{sp}/\sin(\alpha_{sp})$, while the strip-like element inter-gap at the equatorial plane on varying of $N_n$ is calculated as $\Delta g_c=S_c/N_n-L_c/\sin(\alpha_c)$.

Having the preselected angles on the shoulder $\alpha_{sp}$ and at the equatorial plane $\alpha_c$ and the preselected width of the strip-like element L, and having obtained the real number of strip-like elements N to be laid, now the laying trajectory T can be obtained as one among the great number of sequences of laying angles between shoulder and crown.

At this point it is possible to graphically find a help by drawing in a plane (circumferential extension-angle of the strip-like element trajectory), the two limit curves or curves of natural laying $T_o$ and $T_{max}$ for the previously found N, where $T_0$ is the theoretical laying trajectory for N strip-like elements that is obtained by setting $\Delta g=0$, and $T_{max}$ is the theoretical laying trajectory for N strip-like elements obtained by setting $\Delta g=\Delta g_{max}$.

In the aforesaid graphic, starting from the preselected angles at the equatorial plane ($\alpha_c$) and on the shoulder, one of the possible trajectories is traced that is inside the two limit curves and, point by point along the circumferential extension of the tyre cross-section, the angles forming the laying trajectory are detected.

In table 1 below, the angles of the laying trajectories $T_o$ and $T_{max}$ are reproduced, which are obtained with N=63 strip-like elements of width L 12 mm and $\Delta g_{max}=25$ mm, and represented in the figure in a plane (circumferential extension-angle of the strip-like element trajectory) are the two aforesaid curves of natural laying $T_o$ and $T_{max}$ and some possible trajectories with different selected angles on the shoulder $\alpha_{sp}$ and on the crown $\alpha_c$ that satisfy the relation $\Delta g_{sp}(N=63) \leq \Delta g_{max}$ and $\Delta g_{c, (N=63)} \leq \Delta g_{max}$.

TABLE 1

| | | $T_o$ L = 12 mm<br>N = 63 | $T_{max}$ L = 12 mm<br>N = 63 |
|---|---|---|---|
| Extension on<br>the crown | 1795 | 24.9 | 27.5 |
| | 1765.9 | 25.3 | 28.0 |
| | 1736.8 | 25.8 | 28.6 |
| | 1707.6 | 26.2 | 29.2 |

TABLE 1-continued

|  |  | $T_o$ L = 12 mm<br>N = 63 | $T_{max}$ L = 12 mm<br>N = 63 |
|---|---|---|---|
|  | 1678.5 | 26.7 | 29.8 |
|  | 1649.4 | 27.2 | 30.4 |
|  | 1620.3 | 27.8 | 31.3 |
| Extension on | 1591.1 | 28.3 | 31.8 |
| the shoulder | 1562.0 | 28.9 | 32.5 |

The invention claimed is:

1. A tyre for two-wheeled vehicles comprising:
a carcass structure of substantially toroidal shape comprising a central crown portion, two axially opposite shoulder portions, and two axially opposite side portions, each side portion being associated with a respective bead structure;
a belt structure of substantially annular shape applied at a radially external position to the carcass structure at the central crown portion;
a tread band applied at a radially external position relative to the belt structure; and
a pair of sidewalls, each sidewall covering a side portion of the tyre between a lateral edge of the tread band and the respective bead structure,
said tyre having a transverse-curvature ratio f/C≥0.2 and a height sidewall ratio (H−f)/H≤0.7;
said belt structure comprising at least one belt layer formed with a plurality of strip-like elements,
each strip-like element comprising reinforcing thread elements disposed parallel to each other along a longitudinal direction of the strip-like element; and
each reinforcing element being disposed in a laying trajectory defining, at each point, a laying angle relative to a meridian plane of the tyre passing through that point,
wherein a laying angle at one of the shoulder portions ($\alpha_{sp}$) is greater than a laying angle ($\alpha_c$) at an equatorial plane of the tyre,
wherein the strip-like elements of said plurality are laid in such a manner that a distance or gap between a last reinforcing element of a strip-like element and a first reinforcing element of a neighboring strip-like element subsequently laid in a circumferential direction is variable over at least one section of respective laying trajectories, and
wherein a variation in the distance or gap is in relationship with an angle difference on the one of the shoulder portions and at the equatorial plane of the tyre, so that $(\alpha_{sp})-(\alpha_c)\geq 3°$.

2. The tyre as claimed in claim 1, wherein a strip-like element inter-gap at each laying point between the last reinforcing element of one of the strip-like elements and the first reinforcing element of the neighboring strip-like element subsequently laid in the circumferential direction is between 0.35 and 4 mm, the extremes being included.

3. The tyre as claimed in claim 1, wherein the strip-like element inter-gap at each laying point between the last reinforcing element of one of the strip-like elements and the first reinforcing element of the neighboring strip-like element subsequently laid in the circumferential direction is between 0.5 and 2.5 mm, the extremes being included.

4. The tyre as claimed in claim 1, wherein $\alpha_c \geq 14°$.

5. The tyre as claimed in claim 1, wherein $\alpha_c \leq 24°$.

6. The tyre as claimed in claim 1, wherein $\alpha_{sp} \geq 21°$.

7. The tyre as claimed in claim 6, wherein $\alpha_{sp} \leq 30°$.

8. The tyre as claimed in claim 1, wherein said strip-like elements forming said belt layer are present in an integer N smaller than an integer $N_0$, $N_0$ being defined as the whole part of:

$$\text{integer}|(S_c/L * \sin \alpha_c)|$$

wherein:
$S_c$ is a circumferential extension of the belt layer at an equatorial plane of the tyre; and
L is a transverse width of each strip-like element.

9. The tyre as claimed in claim 1, wherein each reinforcing element is disposed from one of the shoulder portions of the tyre to the axially opposite shoulder portion of the tyre.

10. A process for manufacturing a tyre for two-wheeled vehicles of the type provided with a transverse-curvature ratio f/C≥0.2 and a height sidewall ratio (H−f)/H≤0.7, comprising:
manufacturing a carcass structure of substantially toroidal shape, said carcass comprising a central crown portion, two axially opposite shoulder portions, and two axially opposite side portions;
manufacturing a belt structure of substantially annular shape at a radially external position to the carcass structure, at the central crown portion, the manufacturing of the belt structure comprising manufacturing of at least one belt layer through laying on said carcass structure of a plurality of strip-like elements, each strip-like element comprising reinforcing thread elements disposed parallel to each other along a longitudinal direction of the strip-like element, the manufacturing of said at least one belt layer comprising:
determining laying angles of the reinforcing elements at one of the shoulder portions $\alpha_{sp}$ and at the equatorial plane $\alpha_c$ that are to be obtained on the tyre;
determining a laying trajectory of the strip-like elements defining, at each point, a laying angle ($\alpha$) relative to a meridian plane of the carcass structure passing through that point so as to obtain said angles $\alpha_{sp}$, $\alpha_c$, said laying trajectory being in relationship with a strip-like element laying distance or inter-gap between a last reinforcing element of a strip-like element and a first reinforcing element of a strip-like element subsequently laid in the circumferential direction, said distance varying in a controlled and predetermined manner over at least one section of respective laying trajectories of two strip-like elements subsequently laid in a circumferential direction, and wherein a laying inter-gap between adjacent strip-like elements varies, over at least one section of the respective laying trajectories of two strip-like elements subsequently laid in the circumferential direction, in such a manner as to obtain angles on the one of the shoulder portions and at the equatorial plane of the tyre in which $(\alpha_{sp})-(\alpha_c)\geq 3°$; and
laying each strip-like element according to the aforesaid laying trajectory, wherein said laying step takes place in such a manner as to avoid overlapping of ends of the strip-like elements at the shoulder portions.

11. The process for manufacturing a tyre as claimed in claim 10, wherein an integer N of laid strip-like elements designed to form a belt layer is smaller than an integer $N_0$, $N_0$ being defined as a whole part of:

$$\text{integer}|(S_c/L * \sin \alpha_c)|$$

wherein:
$S_c$ is a circumferential extension of the belt layer at the equatorial plane of the tyre; and
L is a transverse width of each strip-like element.

12. The process for manufacturing a tyre as claimed in claim 11, wherein:
said laying trajectory is formed starting from preselected laying angles on the one of the shoulder portions ($\alpha_{sp}$) and at the equatorial plane ($\alpha_c$) of the tyre; and
the strip-like element inter-gap between one strip-like element and the subsequently laid strip-like element varies over at least one section of respective laying trajectories of two subsequently laid strip-like elements in the circumferential direction between the equatorial plane and the one of the shoulder portions, in order to cause variation of said laying angle ($\alpha$) and obtain said preselected angles on the one of the shoulder portions and at the equatorial plane.

13. The process for manufacturing a tyre as claimed in claim 12, wherein the laying trajectory and the strip-like element inter-gap at each laying point between one strip-like element and the subsequently laid strip-like element are a function of:
an imposed maximum gap ($\Delta g_{max}$);
the transverse width of the strip-like element (L); and
said preselected angles on the one of the shoulder portions ($\alpha_{sp}$) and at the equatorial plane ($\alpha_c$).

14. The process for manufacturing a tyre as claimed in claim 10, comprising:
calculating a minimum rounded off by defect between a number ($N_{sp}$) of strip-like elements corresponding to the angle on the one of the shoulder portions and a number ($N_c$) of strip-like elements corresponding to the angle at the equatorial plane min $(_{integer}|N_{sp}; N_c|)$;
calculating $N_1 = \min (_{integer}|N_{sp}; N_c|)-1$;
calculating the strip-like element inter-gap on the one of the shoulder portions ($\Delta g_{sp}$) and at the equatorial plane ($\Delta g_c$) for $N_1$; and
comparing ($\Delta g_{sp}$) and ($\Delta g_c$) with an imposed $\Delta g_{max}$:
if $\Delta g_{sp} \leq \Delta g_{max}$ and $\Delta g_c \leq \Delta g_{max}$, setting $N_1=N$,
on the contrary, if $\Delta g_{sp} \geq \Delta g_{max}$ or $\Delta g_c \geq \Delta g_{max}$, calculating $N_n$ as min $(_{integer}|N_{sp}; N_c|)-n$, on varying of n, and recalculating corresponding strip-like element inter-gap on the one of the shoulder portions $\Delta g_{sp}$ and on the crown $\Delta g_c$ for each $N_n$; setting $N=N_n$ wherein $N_n$ is an integer of strip-like elements satisfying a relation $\Delta g_{sp}(N_n) \leq \Delta g_{max}$ and $\Delta g_c(N_n) \leq \Delta g_{max}$.

15. The process for manufacturing a tyre as claimed in claim 14, wherein $N_c = (S_c/L_c) * \sin(\alpha_c)$ and $N_{sp} = (S_{sp}/L_{sp}) * \sin(\alpha_{sp})$, are S the circumferential extension of the belt layer at angle $\alpha$;
wherein:
$S_c$ is a circumferential extension of the belt layer at the equatorial plane of the tyre;
$L_c$ is a transverse width of each strip-like element at the equatorial plane of the tyre; and
$L_{sp}$ is a transverse width of each strip-like element at the one of the shoulders.

16. The process for manufacturing a tyre as claimed in claim 15, wherein $\Delta g_{sp} = S_{sp}/N_n - L_p/\sin(\alpha_{sp})$ and $\Delta g_c = S_c/N_n - L/\sin(\alpha_c)$.

17. The process for manufacturing a tyre as claimed in claim 10, wherein each reinforcing element is disposed from one of the shoulder portions of the tyre to the axially opposite shoulder portion of the tyre.

* * * * *